United States Patent Office 3,758,382
Patented Sept. 11, 1973

---

3,758,382
PROCESS OF FREEZING BLOOD USING A HYDROXYALKYL STARCH AS CRYOPROTECTIVE AGENT
Charles T. Knorpp, Ann Arbor, Mich., assignor to the United States of America as represented by the Secretary of the Navy
No Drawing. Filed July 26, 1968, Ser. No. 747,806
Int. Cl. A61k 27/10
U.S. Cl. 195—1.8                                            10 Claims

ABSTRACT OF THE DISCLOSURE

A water-soluble hydroxyethyl or hydropropyl starch is used as cryoprotective agent for erythrocytes in the low sub-zero freeze-preservation of blood. The cryoprotective agent is an extracellular solute and is metabolized in the blood stream.

---

This invention relates to the preservation of blood. More and used by or for the Government of the United States of America for governmental purposes without the payment of any royalties thereon or therefor.

This invention relates to the preservtion of blood. More particularly, it relates to a process for freeze-preservation of blood at low sub-zero temperatures in which a solute additive is used as an extracellular protective agent for the erythrocytes.

BACKGROUND OF PRIOR ART

Freeze-preservation is a promising procedure for long-term, large volume, storage of blood. The donor blood is rapidly frozen and stored at low sub-zero temperatures. In time of need, stored blood is thawed to the fluid state by rapidly warming. A problem in the use of this procedure is loss of erythrocytes (red blood cells) by cell disintegration, known as hemolysis, which occurs in the freezing and in the subsequent thawing operations. It is general practice, therefore, to provide protection for the erythrocytes by the addition of a cryophylactic agent to the blood prior to freezing it in the processing to storage.

Intracellular and extracellular substances have been heretofore proposed or used as cryophylactic agents for the erythrocytes in the low sub-zero freeze-preservation procedure for storing blood. Intracellular cryoprotective agents, such as glycerol, have the disadvantage that it is necessary to remove them from the erythrocytes prior to administration of transfusions. Extracellular cryoprotective agents, unless they can be metabolized, have an imposed limitation of a molecular weight which will avoid the possibility of long term retention of the cryoprotective agent in the recipient.

Desirably, a cryophylactic agent for the erythrocytes in the practice of the freeze-preservation procedure for long term storage of blood would be an extracellular substance which can be metabolized and administered with the erythrocytes. The use of such a cryoprotective agent would provide the advantages of reducing to a minimum the processing of the blood after thawing and avoidance of the possibility of long-term retention of the cryoprotective agent in the recipient of the transfusion.

The present invention has an object, therefore, the provision of a metabolizable, extracellular, cryoprotective agent for erythrocytes in the low sub-zero temperature freezing of blood and in the subsequent thawing of the frozen blood.

It is also an object to provide an improved process for preserving blood at low sub-zero temperatures in which the erythrocytes are provided with protection against hemolysis by the use of an extracellular solute additive which is metabolized in the blood stream of the transfusion recipient.

STATEMENT OF INVENTION

The above and other objects are accomplished in accordance wtih the present invention by the use of a water-soluble hydroxyethyl or hydroxypropyl starch as the cryoprotective agent for the erythrocytes in the low sub-zero temperature freezing of blood. Used in amounts to provide a concentration of from about 12 to 16% weight by volume of the soluble hydroxyalkyl starch in the blood, a high recovery of erythrocytes is achieved after low sub-zero freezing ($-196°$ C.) and subsequent thawing of the frozen blood.

Starch which has been hydroxyethylated or hydroxypropylated to a degree of substitution of from about 0.5 to 1, i.e., contains from about 0.5 to 1 hydroxyethyl or hydroxypropyl groups per glucose unit, is water-soluble and useful as the cryophylactic agent for the erythrocytes in the freeze-preservation process of the invention. Preferably, a hydroxyethyl starch or hydroxypropyl starch is used which contains from about 0.6 to 0.8 hydroxyethyl or hydroxypropyl groups per glucose unit.

Water-soluble hydroxyethyl and hydroxypropyl starches are retained in the blood stream for varying periods of time, the length of which depends on the size of the molecule. They are slowly degraded in the blood stream by alpha amylase, an enzyme normally present in the blood stream, and the products of the metabolism excreted. They offer no difficulty in the renal tract. The size of the molecule of these hydroxyethyl and hydroxypropyl starches is a matter of viscosity and therefore of ease in handling and using them. While those of high molecular weight may be used effectively as the cryoprotective agent for the erythrocytes in the process of the invention, it is preferred, as a matter of ease in use and for shorter periods of retention in the blood stream, to employ the water soluble hydroxyethyl and hydroxypropyl starches which have an average molecular weight from about 40,000 to 70,000.

The process of the invention is applied for the freeze-storage of blood which has been prepared with an anticoagulant, such as acidified citrate dextrose (ACD), which may be added and mixed with the blood in conventional manner. The soluble hydroxyethyl starch or hydroxypropyl starch is then added to the blood, suitably from a concentrate solution in normal saline solution. The blood-additive mixture is rapidly frozen under agitation in a metal (aluminum) container immersed in liquid nitrogen at $-196°$ C. using the Linde blood-freezing apparatus and technique (Rinfret et al., U.S. Pat. 3,347,-745). In this freezing technique, a hard frozen shell of the blood-additive mixture is formed on the inner surface of the metal container.

The frozen blood may be stored for long periods up to several years at temperatures between $-140°$ C. and $-196°$ C. by refrigeration with liquid nitrogen. Thawing of the frozen blood is accomplished by a rapid warming using the Linde thawing technique (above patent) in which the container with the frozen blood is immersed and agitated for a very short period of time, 90–120 seconds, in a water bath at 47° C.

The process of the invention is illustrated by the following collective example using hydroxyethyl starch (about 0.8 degree of substitution and 45,000 average molecular weight) as the cryoprotective additive. The hydroxyethyl starch was added to the blood as a concentrate (40% weight by volume) in normal saline solution and mixed with the blood to form a solution.

EXAMPLE

Multiple (fifty-one) 55-milliliter units of whole human blood containing acidified citrate dextrose were prepared with the hydroxyethyl starch in a final concentration of 12 to 14% weight by volume (average) as the cryophylactic agent. The blood-additive solutions were frozen in metal containers immersed in liquid nitrogen at −196° C. under agitation with the use of the Linde blood-processing apparatus and technique. The blood-additive mixture was agitated during freezing at a rate of 200 cycles/min. for a period of about 80 seconds. The frozen blood was stored for periods of up to one week in liquid nitrogen vapor at approximately −140° C.

Thawing of the frozen blood was accomplished by immersion and agitation of the metal container for 60 seconds at 160 cycles/min. in a water bath at 47° C. The temperature of the thawed blood at the time of removal from the water bath was approximately 37° C.

Studies in vitro of the blood specimens after thawing were conducted for measuring the total recovery of the erythrocytes, the efficiency of the process or saline stability and concentration of supernatant hemoglobin. The recovery of erythrocytes in vitro averaged 97.4% and ranged as high as 99%. The saline stability averaged 83.4%. Amounts of hemoglobin in the plasma averaged 283.3 mg. per 100 ml.

In the manner of the above example, separate multiples of 55-milliliter units of whole human blood containing acidified citrate dextrose were prepared on the one hand, with hydroxyethyl starch having about 0.8 degree of substitution and 70,000 average molecular weight, and, on the other, with hydroxypropyl starch having approximately 0.5 degree of substitution in final concentration of 12 to 14% weight by volume (average) of the cryophylactic agent. The blood-additive samples were frozen to −196° C. with liquid nitrogen and the frozen blood thawed as in the above example.

Studies in vitro of the blood specimens after thawing showed erythrocyte recovery, saline stability and amounts of hemoglobin in the plasma which were of the order of those found for the blood specimens of the above example.

The hydroxyethyl and hydroxypropyl starches used as the cryophylactic agent for erythrocytes in the process of the invention are not toxic. They are, as mentioned above, metabolized in the blood system and the products of the metabolism excreted.

While the invention has been described herein with reference to certain specific embodiments thereof, such are intended by way of illustration and not in limitation.

What is claimed and desired to be secured by Letters Patent of the United States is:

1. A process of preserving blood containing an anticoagulant which comprises adding thereto and mixing therewith an amount of an hydroxyalkyl starch having an average molcular weight of from 40,000 to 70,000 and a degree of substitution of from 0.5 to 1.0 and is selected from the group conisting of hydroxyethyl starch and hydroxypropyl starch to form a blood solution which contains from about 12 to 16% weight by volume of the hydroxyalkyl starch, and subjecting said blood solution to rapid freezing down to a temperature of about −196° C.

2. A process as defined in claim 1, wherein the hydroxyalkyl starch has from about 0.6 to 0.8 degree of substitution.

3. A process defined in claim 2, wherein the hydroxyalkyl starch has an average molecular weight of about 70,000.

4. A process as defined in claim 1, wherein the hydroxyalkyl starch is hydroxyethyl starch.

5. A process as defined in claim 1, wherein the hydroxyalkyl starch is hydroxypropyl starch.

6. A process as defined in claim 2, wherein the hydroxyalkyl starch is hydroxyethyl starch.

7. A process as defined in claim 2, wherein the hydroxyalkyl starch is hydroxypropyl starch.

8. A process as defined in claim 3, wherein the hydroxyalkyl starch is hydroxyethyl starch.

9. A process as defined in claim 3, wherein the hydroxyalkyl starch is hydroxypropyl starch.

10. A process of preserving blood containing an anticoagulant which comprises adding thereto and mixing therewith an amount of an hydroxyalkyl starch selected from the group consisting of hydroxyethyl starch and hydroxypropyl starch to form a blood solution which contains about 12% weight by volume of the hydroxyalkyl starch, and subjecting said blood solution to liquid nitrogen rapid freezing technique.

References Cited
UNITED STATES PATENTS

| | | | |
|---|---|---|---|
| 3,347,745 | 10/1967 | Rinfret et al. | 62—67 |
| 2,908,614 | 10/1959 | Muggleton et al. | 424—180 |
| 2,786,014 | 3/1957 | Tullis | 424—101 |
| 3,177,117 | 4/1965 | Saunders | 424—101 |

OTHER REFERENCES

Strumia: Science, Oct. 14, 1949, vol. 110, pp. 398–99.

ALBERT T. MEYERS, Primary Examiner

D. M. STEPHENS, Assistant Examiner

U.S. Cl. X.R.

424—180; 62—62